United States Patent [19]
Sperberg

[11] 3,722,270
[45] Mar. 27, 1973

[54] NON-DESTRUCTIVE METHOD OF DETERMINING TIRE LIFE

[76] Inventor: Lawrence R. Sperberg, 6740 Fiesta Drive, El Paso, Tex. 79912

[22] Filed: Feb. 12, 1971

[21] Appl. No.: 114,997

Related U.S. Application Data

[60] Division of Ser. No. 847,778, July 14, 1969, Pat. No. 3,563,088, which is a continuation of Ser. No. 578,707, Sept. 12, 1966, abandoned, which is a continuation-in-part of Ser. No. 504,727, Oct. 24, 1965, Pat. No. 3,397,583.

[52] U.S. Cl. .................................................73/146
[51] Int. Cl. ............................................G01m 17/02
[58] Field of Search.................................73/146, 8

[56] References Cited
UNITED STATES PATENTS 3,397,583   8/1968   Sperberg ..............................73/432
3,563,088   2/1971   Sperberg ..............................73/146

*Primary Examiner*—Donald O. Woodiel
*Attorney*—Marcus L. Bates

[57] ABSTRACT

A non-destructive method of determining the durable life of a tire by measuring the lateral and radial force variations exhibited by the tire. A series of similar tires are measured for their force variations, and subjected to usage in order to determine the effect of the force variations upon the durable life characteristics of the series. The force variations exhibited by the tire are compared to the data obtained from the series of tires in order to non-destructively determine the life of the tire.

10 Claims, 7 Drawing Figures

PATENTED MAR 27 1973  3,722,270

*INVENTOR.*
LAWRENCE R. SPERBERG
*BY*
MARCUS L. BATES

NON-DESTRUCTIVE METHOD OF DETERMINING TIRE LIFE

CROSS REFERENCE TO RELATED APPLICATIONS

This application is a division of patent application Ser. No. 847,778 filed July 14, 1969, now U.S. Pat. No. 3,563,088; which was a continuation of patent application Ser. No. 578,707 filed Sept. 12, 1966, now abandoned, which in turn was a continuation-in-part of Ser. No. 504,727 filed Oct. 24, 1965, now U.S. Pat. No. 3,397,583.

BACKGROUND OF THE INVENTION

This invention relates to testing and to the control of manufacture of tires, and in particular to the testing and evaluation of pneumatic vehicle tires for their wear and durability characteristics.

In order to fully understand the present invention, reference is made to the above indicated U.S. Pat. No. 3,563,088 and to U.S. Pat. No. 3,554,027, and in particular to the background of the invention set forth therein, which is incorporated into this disclosure by reference thereto.

SUMMARY OF THE INVENTION

This invention relates to a method of non-destructively determining the durable life of a tire by measuring the lateral and radial force variations exhibited by the tire. A series of similar tires are measured for their force variations, and subjected to usage in order to determine the effect of the force variations upon the durable life characteristics of the series. The force variations exhibited by the tire are compared to the data obtained from the series of tires in order to non-destructively determine the life of the tire.

As tires are subsequently manufactured, they are measured to determine the force variations, so as to enable the safer tires to be segregated from the unsafe or less desirable tires. Some of the tires exhibiting large force variations must be destroyed. Other tires exhibiting moderate force variation may be rendered more acceptable by subjecting the individual tire to a grinding operation so as to improve its durable characteristics.

It is accordingly an object of this invention to provide a non-destructive method by which the durable life of an imperfect tire can be determined.

Another object of this invention is to provide a non-destructive method of determining the irregular wear susceptibility of a tire.

Still another object of this invention is to provide a non-destructive method of accurately controlling the process of tire manufacture, to thereby provide tires of maximum durable life.

A still further object of this invention is to determine the performance of perfect tires of the same type and construction from performance data based on imperfect tires, and to determine the performance of comparable manufactured tires, each having a certain degree of imperfectness such as may be required for a specific type service application.

Still another object of this invention is to provide a means of evaluating the effect brought about by a slight change in the tire manufacture upon the durable life properties of a tire.

Another object of this invention is to enable the determination of wear and durability as influenced by a change in constructional features of the tire and wherein the determination is made by using imperfect tires and adjusting the results of the determination to coincide with the results that would have been obtained from tires of a comparable degree of imperfectness.

An additional object of this invention is to provide a process control for the manufacture of tires whereby the durable life of a tire can be predetermined to thereby eliminate the production or marketing of tires having unacceptable wearing and durability properties.

A still further object of this invention is to provide the tire manufacturer with a method of grading tires that enables segregation of tires of varying imperfectness into categories of tires having durability and/or wear characteristics suitable for different degrees of severity of usage.

A still further object of this invention is to permit a more accurate characterization of wear differences existent between different composition tread compounds of a tire where the tread compounds are placed on the periphery of the tire in such a manner as to permit from two to ten different tread compositions to be tested on each tire body, and where the individual tread arcs are measured for their radial and lateral force variations, as subfunctions of the total radial and lateral force variation of the complete tire, and then determining the proper multiplier to use for each individual tread arc so as to correct each subsequent observed tread loss of each tread arc to the true losses of the tread compound separate and distinct from the tread wear losses due solely to the dynamic flexibility characteristics of each tread arc.

Other objects of this invention will become apparent from the following description and claims:

Figure 4:
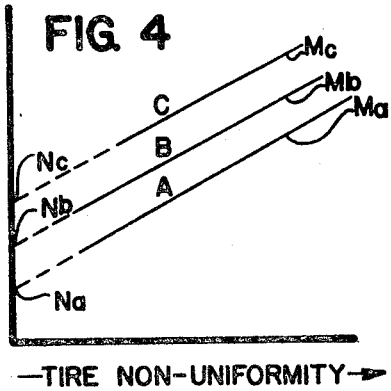

FIG. 4 is a curve showing the effect of tire non-uniformity on the rate of wear of the tread wearing compound as well as the tire durability. Hence FIG. 4 is actually two separate series of curves illustrated in a single figure and showing two separate and distinct relationships; first, the relationship between tire durability and tire non-uniformity; and second, the relationship between tire rate of wear and tire non-uniformity.

Figure 5:
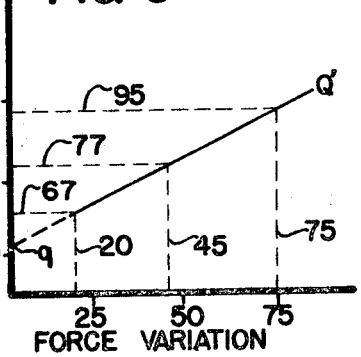

FIG. 5 is a curve illustrating the effect of force variation on the rate of wear of the tread wearing compound.

Figure 6:
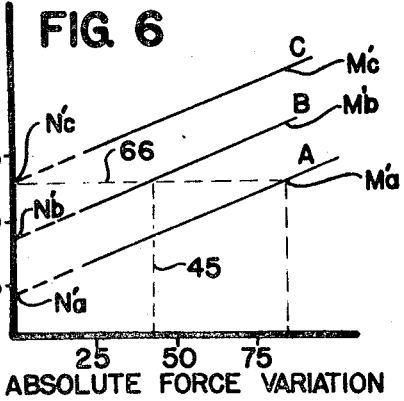

FIG. 6 is a series of curves showing the effect of absolute force variation upon the rates of wear of the tread wearing compounds of three types of tires.

Figure 7:
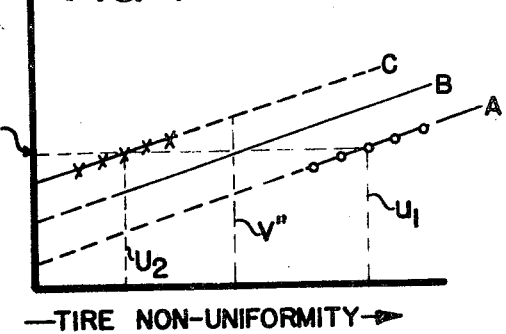

FIG. 7 is a series of curves illustrating the effect of tire non-uniformity upon the durabilities of three types of tires.

The measured imperfections in a tire include imbalance, external radial runout, internal radial runout, loaded radial runout, radial force variation, lateral force variation, and tangential force variation. Radial runout is simply the variation of a tire from a perfect planar circle, both interior and exterior, when the tire is mounted on a dimensionally perfect wheel. Radial and lateral force variation represent measured force variations in the two identified planes as a tire rotates through its 360° cycle. The tangential force variation relates to the variation in force produced between the ground and the ground contacting tread portion of the tire as the tire rotates through its 360° cycle.

The static tire tread footprint contact pressure profile is a partial indicator of the tangential forces generated by the rotating tire against a supporting surface. The tangential force variation, although difficult to measure dynamically, is a major factor in the wear rate of a tire, and especially the variation in wear rate around the tire.

The dynamic flexibility of a tire includes all of the forces present at any given point in a tire and includes the above recited forces. The rate of wear of a tire is directly related to the variation of tangential forces generated by the constantly changing and varying footprint of a tire against the tire contact surface as the tire rotates through its 360° circumference. In the above hypothetical perfect tire, the tangential force between the tire tread and the road surface would be constant and unvarying around its 360° circumference, and accordingly, this idealized tire would exhibit a maximum durable life. Any variation in this otherwise constant tangential force will lower the durable life of the tire as well as causing it to wear at different rates around its 360° of circumference. Lateral and radial force variations cause variations in the tangential forces as reflected by the constantly varying footprint contact profile and configuration. Since the tangential force variation cannot be conveniently measured dynamically, and while the radial and lateral force variations can be measured dynamically, these two latter force variations are used in the analysis of the dynamic flexibilities of a tire, although it would be preferable to use the tangential force variation if such a force could be conveniently measured.

Figure 1:
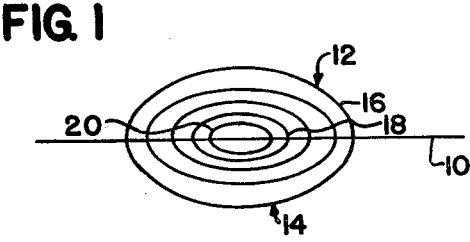
FIG. 1 is a schematical representation of the tangential force gradient exerted by a nearly perfect tire tread footprint contact area onto a normal supporting flat surface.

The tangential forces of an idealized perfect tire are illustrated in FIG. 1, wherein there is seen a tire tread footprint illustrated by lines representing the constant contact pressure points and presumably constant tangential force lines as well. Numeral 10 bisects the tire print and represents the center of the path along which the tire moves. The upper half of the footprint is illustrated by the arrow at numeral 12, the lower half by the arrow at numeral 14, the outermost constant pressure line by numeral 16, and the innermost constant pressure line by numeral 20. The lines of constant pressure points lying between the magnitude illustrated by numerals 16 and 20 are indicated by numeral 18. The lines of constant pressure on each side 12 and 14 are noted to be symmetrical with respect to each other, and accordingly, a tire exhibiting a pressure profile such as illustrated in FIG. 1 would be expected to have a minimum tangential force variation as it rotates through its 360° circumference and accordingly maximum durable life characteristics.

Figure 2:
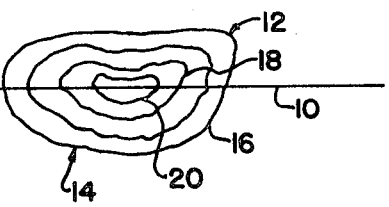
FIG. 2 is a schematical representation of the tangential forces present at the interface between an imperfect tire tread footprint contact area and a flat supporting surface.

FIG. 2 represents a pressure profile of the tangential forces exhibited by an imperfect tire, wherein the tire tread footprint outlined by lines representing the constant contact pressure points are distorted and unsymmetrical with respect to each other. Tires of varying degrees of imperfectness will have constantly changing pressure profiles that depart from FIG. 1 in a manner illustrated by FIG. 2.

Ordinarily produced tires have varying degrees of imperfectness as exemplified by the items identified above. A maximum level of acceptability of major degrees of imperfectness may arbitrarily specify thirty four pounds radial and eleven pounds lateral force variation under certain specified conditions of inflation, applied load, and speed for a 7.75-14 tire for the specific uniformity machine used, for example. The varying levels of arbitrary acceptability may be determined from a performance graph derived from a sufficient sample size to accurately characterize such graph, wherein the magnitude of a specific imperfection is plotted against cumulative percent of total sample for a specific type of service application. In the specified example referred to, the limits fall approximately at the ninety five percent point of each individual curve of percent of total versus radial force variation and percent of total versus lateral force variation. Thus in the example cited, roughly five to ten percent of commercially produced passenger tires fall outside this specification and would be excluded from the test sample of the marketable tires for the specific type of service application. The point of exclusion, whether by absolute value or by percent of total sample, is determined by empirical means for any type of service application. With reference to the specification of thirty four and eleven pounds respectively, it is not uncommon to encounter individual tires which may exceed these values by two-to-five-fold. Such structurally deficient tires have a very marked influence upon absolute rate of wear and upon tire durability, and their inclusion in a group of tires to be marketed would lead to early replacement, for they will not perform satisfactorily in the field. Applicant has determined that tires of the specifications identified above wear twenty to forty percent faster than identically constructed structurally perfect tires and that it is not uncommon to encounter tires that wear at a 50 percent faster rate than their structurally perfect counterparts. The degree of wear difference, whether 20 or 40 percent, depends upon the manner in which the investigator treats the data in extrapolating to zero imperfection. As stated previously, tires having varying degrees of imperfectness generally have a durable life related to the degree of imperfectness, and in this respect the general analogy may be drawn that tire durability and rate of wear compared to a structurally perfect tire are both adversely affected in direct proportion to the magnitude of the imperfection.

In the above example of a 7.75-14 tire, the normal applied load carried by one tire of a vehicle containing four or five passengers would be about one thousand pounds, hence the tire may be tested for radial and lateral force variation at an applied load of one thousand pounds and under normal inflation pressure at a specified speed. Of one thousand tires sampled, only 50 would normally be expected to show a radial force variation greater than 34 pounds, which is 3.4 percent of the applied load, or conversely ninety five percent of the tires. Another fifty tires would be expected to show a lateral force variation greater than 11 pounds. Since there is no direct relationship between radial and lateral force variation, the number of unsatisfactory tires being thus eliminated as potentially undesirable may be a minimum of 50 or a maximum of one hundred dependent upon the number of tires being excluded for exceeding the limits of both radial and lateral force variation. These values are predicated upon a threshold acceptance level of 34 pounds radial or 11 pounds lateral force variation being the dividing line between acceptable and non-acceptable tires for general commercial service. The lateral force variation threshold has been established at about one-third of the radial force variation. Therefore the absolute force variation, for this specific example, has been established as 45 pounds.

Figure 3:
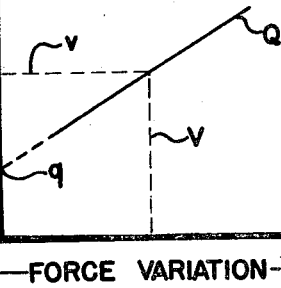
FIG. 3 is a curve illustrating the effect of force variation upon the durability of a tire as measured on an indoor test wheel.

Looking again now at the figures of the drawings wherein the force variations, including the lateral and radial force variation, are plotted against the tire durability and wear susceptibility, there is seen illustrated therein a series of curves showing that as the imperfectness of a tire is increased, the durable life decreases. In FIG. 3, the Curve $q$–$Q$ shows that as the force variation increases, the "miles to failure" decreases, as measured on a test wheel. A particular tire having a durable life characterized by the Curve $q$–$Q$, and having a measured force variation $V$, would normally run the number of miles or hours represented by $v$. The force variation as used herein includes all the before recited measurable aspects relating to non-uniformity and accordingly includes tangential force variation as reflected by the sum of radial and lateral force variation.

A perfect tire, that is, a tire having zero lateral and radial force variation, has a maximum life expectancy such as exemplified by a point near numeral N on the Curves A, B, and C of FIG. 4 wherein the three curves represent three different tire constructions. Tire A represents an improved construction over tire B, which in turn is an improvement over tire C as regards wear susceptibility or as regards tire durability. It is emphasized again that absolute wear and absolute durability are entirely different and unrelated parameters when defining or describing the performance characteristics of different construction tires. A specific tire construction might have an exceptionally long wearing tread composition which would rate it as the A tire in FIG. 4 as regards wear susceptibility but at the same time its overall construction characteristics might rate it as the C tire of FIG. 4 as regards its durability characteristic. Similarly, another tire with a fast wearing tread composition, but with exceptional body components and construction features, might be rated a C tire in the wear parameter but an A tire in its ultimate durability. Hence the wear represented by point N$a$, N$b$, or N$c$ depicts an amount of wear where the variation in tangential forces are a minimum value and accordingly the dynamic flexibility of the tire are at the minimum values obtained when the idealized constant pressure footprint is at its optimum configuration of FIG. 1. An imperfect tire, that is, a tire having some degree of imperfectness, would exhibit a wear rate greater than this minimum value and in proportion to the magnitude of its force variation, or tire non-uniformity, and would fall somewhere between points N and M of FIG. 4, where M represents the maximum wear rate obtained on the tire having the maximum imperfectness that would still be marketable. As the imperfectness, or non-uniformity, of the tire increases, the durability or "miles to failure" decreases in accordance with the curves of FIG. 4. The constantly irregular pressure footprints of such tires throughout their 360° circumference will resemble that illustrated in FIG. 2, wherein the tangential forces, or dynamic flexibility, would be greater than that obtained for the optimum configuration of FIG. 1.

It should be understood that FIG. 4 is actually two separate series of curves illustrated in a single figure and showing two separate and distinct relationships; first, the relationship between tire durability and tire non-uniformity; and second, the relationship between tire rate of wear and tire non-uniformity. Tire durability and rate of wear are directly related only in tires of a given construction; they are not directly related when comparing tires of two or more different constructions.

FIG. 5 illustrates the effect of force variation upon the amount of tread stock abraded away as measured in mils lost/4000 miles driven in a controlled wear performance test. An absolutely perfect tire will wear at a minimum value of fifty-five mils/4000 miles driven, as illustrated by the point $q$ where Curve $q$–$Q$ intercepts the ordinate. Tires having any measure of force variation will exhibit a tread loss greater than the minimum value. Tires, as in the previous example of the 7.75–14 tire, having a force variation greater than 45 pounds (lateral and radial) are usually considered unacceptable for general service application.

The maximum value of acceptance has been arbitrarily set at 45 pounds force variation, which is the sum of the lateral and radial force variation measured by a specific design of tire uniformity tester. Any tire having a radial or lateral force variation greater than 34 and 11 pounds, respectively, is generally considered unacceptable for general service application, although it might be considered to be perfectly adequate for slow speed or town driving.

Curve $q$–$Q'$ of FIG. 5 was obtained in a designed test program in order to characterize the influence of radial and lateral force variation as it influences the particular 7.75–14 tire manufacturer. Each tire, as it is produced, can be measured for its non-uniformity and from the data represented by Curve $Q'$ of FIG. 5 the estimated life of the tire as well as its wear potential can be predetermined with accuracy. For example, a tire having a cumulative radial and lateral force variation of twenty pounds absolute will have a tread life as represented in Curve $Q'$ of about 67 mils loss for each 4000 miles driven under average driving conditions. For a tread depth designed for 0.33 inches wear on the tread wearing surface, such a tire will ordinarily give a service equivalent of about 19,700 miles normal service. Conversely, the same tire exhibiting a measured seventy five pounds radial and lateral force variation will give a service of only 13,900 miles, in accordance with Curve $q$–$Q'$ of FIG. 5.

It should also be evident that this novel test method may be used in the tire testing industry to examine an imperfect tire by first determining its radial and lateral force variation, testing the tire to determine its imperfect durable life, (durability and/or wear susceptibility) and then using the dictionary of stored data represented by FIGS. 4 and 5 to determine, by extrapolation, the durable life (either durability or wear susceptibility) of the same tire had the tire been perfect.

FIG. 6 illustrates a more complex form of FIGS. 4 and 5 wherein the effect of the absolute force variation upon the amount of tread stock abraded away by the road surface is illustrated by the three Curves A, B, and C. Curve C represents an inferior grade of tire as regards the ability of the tread stock to withstand abrasive wear. Curve B represent a tire having improved abrasive resistance over tires characterized by Curve C, and Curve A represents a tire having still further improved abrasive resistance over tires B and C. It is pointed out that the term "tire" is used to designate a particular tire design or construction. As seen in FIG. 6, a perfect tire will have an unusually long tread life, regardless of its design, and will intercept the ordinant somewhere at a low value N. A highly imperfect tire will wear at a faster rate and thus, at point M rate of wear, tires of construction A could have two times the degree of imperfectness compared to tires of construction B and many fold the degree of imperfectness of tires of construction C and still maintain a possible acceptable wear rate.

Since there are no perfect tires, as exemplified by low wear rate N, and since a tire such as exemplified by fast wear rate M are unacceptable, except possibly for extremely light conditions of usage, some reasonable value of acceptance between these two points must be arbitrarily set that enables mass production of tires that are of an acceptable quality to the consumer.

FIG. 7 illustrates a condition wherein experimental data, when not treated according to the concepts of the instant invention, could lead the experiment or to evaluate a poor tire as being equivalent to a superior tire, or vice versa. Curve B characterizes a normal production line tire of a specific design, wherein Curve B has been established or characterized by a large number of samples over a wide range of tire non-uniformity. Curve B may be said to be the process control for a particular tire design wherein any defect in a tire will show up as an abnormal increase in the non-uniformity thereof. A tire having a magnitude of imperfectness greater than the $v$ intercept for the V level of imperfectness of tire B is considered unsuitable for general service. Any change in the process of manufacture of Tire B will be exemplified as a new Curve A or C wherein A represents a desirable change while C represents an undesirable change from the standpoint of durability. A limited number of samples $(O)$ of curve A compared to a limited number of samples $(x)$ of Curve C may be used to establish new curves C and A wherein, according to the teachings of this invention, it is readily apparent that the tires of Curve C are of inferior design as compared to the tires of Curve A. In the absence of a consideration of tire non-uniformity, it would appear that the change in the process of manufacture had no influence upon the tire manufacture since the tire durability at V remains constant for all three tire designs. A consideration of FIG. 7 shows that while the tires $(x)$ and $(o)$ per se, are of the same durability, they are nevertheless of different quality and that the tested tires $(x)$ and $(o)$, when corrected to the non-uniformity level V, represent a decided improvement $(o)$ and a decided lowering in quality $(x)$.

Non-uniformity in truck tires is greater than in passenger tires. This is evident from studies of wear variation measured around the 360° circumference of a large number of whole tread truck and passenger tires. Where the standard deviation of wear variation of one 45° arc of circumference of a passenger tire compared to another 45° arc amounts to between 3.5 to 4 percent for the above 7.75-14 tire having a 45 pound combined radial and lateral force variation, the standard deviation of wear variation of a "comparable truck tire is of the order of 10 percent. Such a variation in truck tires corresponds to a combined radial and lateral force variation approaching 100 pounds in a passenger tire, which is totally unacceptable for general service passenger car application. Since cross country highway trucks are progressively traveling at faster speeds and hauling heavier loads with the development of larger power plants, the problem of making satisfactory tires for use on these vehicles is becoming more acute. One answer to this problem is to substitute the radial belted truck tire for the more conventional bias constructed tire in order to achieve better durability and better wear resistance; another answer is to decrease the tire body thickness by using larger tire cords and fewer body plies in order to improve the durability. It is evident from the teaching of this invention that conventional truck tires having a minimum of imperfectness will also solve the problem posed by these severe service applications, since such tires will have a maximum durability as well as a maximum resistance to abrasive wear regardless of whether the tires are bias constructed or radial belted.

As pointed out in my co-pending application, Ser. No. 504,727 it is possible to place two to 10 different tread compositions to be tested on a single tire body where each of the individual tread arcs or segments may be measured for their radial and lateral force variations. The magnitude of the radial and lateral force variation of each of the individual tread arcs constitutes a sub-function of the total radial and lateral force variation of the entire tire. The tire may then be tested either on an indoor testing wheel or by actual road testing to thereby determine the rate of wear of each individual tread compound or each tread arc. The rate of wear of each individual segment or tread arc is a function of both the tread composition and the non-uniformity of the tire. In accordance with the principles set forth above, a proper multiplier can be determined for each individual tread arc so as to correct each subsequent observed tread loss of each tread arc to the true losses of the tread compound and accordingly ascertain the tread wear or tread losses due solely to the dynamic flexibility characteristics of each tread arc and to determine the tread wear losses due solely to the abrading away of the tread compound by the road surface. By employing a multi-section tread tire in carrying out the wear test, the accuracy of the test is greatly improved, especially where a statistically designed screening wear test is employed.

As further pointed out in my copending application, actual wear testing expense may be greatly reduced by subjecting the tire to a lathing operation wherein a predetermined amount of the outermost tread material is artificially removed, to thereby enable rapid evaluation of the rubber at different tread depths. This expedient of lathing the tire also finds utility in removing radial imperfections caused by the rubber "bunching up" during the vulcanization process; and accordingly, a tire that has a radial force variation that exceeds a predetermined acceptance level may often be reduced to a satisfactory force variation by this operation.

It should be recognized that varying levels of acceptability may be arbitrarily selected in accordance with the aim of a particular manufacturer for a specific type of market or service application. Furthermore, a tire that is acceptable to an average consumer today might be totally unacceptable a few years hence due to a tightening up of manufacturing operations and techniques as industry pushes toward safer tires and as the present road systems are improved so as to permit faster speeds. That is, the specific limits of acceptability set by a manufacturer will usually be governed by the projected use of the tire. For example, a police car operating at one hundred and 20 miles per hour compared to the ordinary vehicle operating up to 70 and 80 miles per hour would require a much more uniform tire with a high durability since structural failure is far more likely to occur under the severe usage of the first vehicle as compared to the latter vehicle. Therefore a tire having a 34 pound radial and an eleven pound lateral force variation, used under severe conditions as set forth in the above example, may be totally unsatisfactory for the severe usage exemplified by the first vehicle, but at the same time such a tire may be acceptable for use on the second vehicle.

As pointed out in U.S. Pat. No. 3,397,583, the individual tires of any random chosen group of tires will exhibit varying degrees of imperfectness which is generally proportional to the durable life thereof. Hence, tires have a durable life which is generally proportional to the degree of imperfectness thereof. The elimination of production tires possessing unacceptable force variation characteristics leave a residuum of tires which enjoy a durable life far exceeding the durable life of the more imperfect tires. The more imperfect tires exhibit a marked impairment in safety, which includes fast and irregular wear about the tire circumference.

Many of the imperfect tires may be transposed into a more nearly perfect tire by grinding away a selected portion of the tread so as to temporarily relieve the effect of the imperfectness. Yet the basic cause of tire imperfectness is not always cured by this expedient for the reason that tire imperfectness is usually caused by uneven cord tension and the like which causes uneven force distribution about the tire. Grinding away part of the tread surface is effective to permanently cure a deflective tire only when the defectiveness can be attributed to the localized misplacement of part of the tread rubber. Hence, when the non-uniformity is a direct result of improper cord arrangement, grinding or removal of portions of the tread stock attains a temporary improvement for a few thousand miles of wear, whereupon the influence of the non-uniformity eventually returns to again lower the tire safety and wear. This temporary improvement in safety is desirable, however, for it greatly improves the overall durable life of the tire.

I claim:

1. A method of determination of wear susceptibility of a tire comprising the steps of:
    1. measuring the non-uniformity of force variations present in a predetermined number of like tires representative of said tire under identical test conditions;
    2. measuring the rates of wear of said predetermined number of tires under specific conditions to thereby ascertain the effect of said force variationS upon the wear properties of said predetermined number of tires;
    3. storing the force variation and wear data obtained in steps (1) and (2) to provide a dictionary of the effect of said force variations upon the wear properties of said predetermined number of tires;
    4. measuring the non-uniformity of force variations present in said tire under said test conditions;
    5. comparing the force variations of said tire to said stored data to thereby non-destructively determine the wear susceptability of said tire.

2. The method of claim 1 wherein the step of measuring the non-uniformity of force variations includes measuring the variation in tangential forces exerted by the footprints of said predetermined number of tires.

3. The method of claim 1 and further including the step of:
    6. selecting tires in accordance with the results of step (5) to enable providing groups of tires for test purposes wherein said tires of each group have comparable degrees of non-uniformity to thereby enable a true comparison to be established between the tires of the different test groups.

4. The method of claim 1, and further including the steps of:
    6. selecting tires in accordance with the results of step (5) to thereby enable providing groups of tires wherein each said group exhibits similar degrees of imperfectness;
    7. providing each tire with indicia identifying the tire with the group to which the tire belongs; whereby: a tire may be evaluated and identified to thereby enable it to be placed in service where the severity of usage to which the tire will be subjected does not exceed the durable capabilities of the tire.

5. The method of claim 1, and further including the steps of:
    6. separating the tires of step (5) into a first and second group, wherein the first of said groups includes the tires exhibiting force variations which are of a smaller magnitude as compared to the remaining tires which form the second group;
    7. subjecting the tread of the tires of the second group to a controlled tread rubber removing operation, and
    8. removing rubber from predetermined areas of the tread in accordance with step (7) so as to improve the force variation of step (4).

6. The method of claim 1, and further including the steps of:
    6. carrying out step (5) for a plurality of tires;

7. separating the tires of step (6) into a first and second group of tires, wherein the first group of tires each have force variations which are of a lower magnitude relative to the second group of tires;
8. subjecting the tread of said second group of tires to a controlled tread rubber removing operation;
9. utilizing the stored data of step (4) to determine the amount and location of tread rubber to remove in step (8) in order to minimize the apparent source of force variations determined in step (4), to thereby improve the durability and resistance to abrasive wear of the second group of tires.

7. The method of claim 1 wherein the determination of true wear differences is utilized to prolong the life of the tire according to the following steps:
   6. subjecting the tread of said tire to a grinding operation;
   7. removing a predetermined amount of tread wearing compound from the tread wearing surface of the tire to thereby remove the apparent source of radial and lateral force variations.

8. The method of claim 1 wherein the determination of true wear differences is utilized to prolong the life of the tire according to the following additional steps:
   6. subjecting the tread of said tire to a controlled tread rubber removing operation;
   7. utilizing the stored data of step (4) to thereby determine the amount of rubber to remove from said tire in order to remove the apparent source of radial and lateral force variations determined in step (5).

9. A method of classifying tires according to the wear property thereof comprising the steps of:
   1. placing a plurality of the same size tires on a tire non-uniformity measuring machine so as to enable the magnitude of non-uniformity of force variations to be determined for each said tire under identical test conditions;
   2. wearing away at least part of the tread wearing surface of a portion of the tires of step (1) under specific conditions with the number of tires in said portion being of a sufficient sample size to enable the effect of the non-uniformity of force variations upon the wear property to be determined;
   3. storing the force variation and wear data of steps (1) and (2) to provide a dictionary of stored terms which relates the effect of the force variations upon the wear properties of said portion of the tires of step (1);
   4. comparing the measured force variations of the unworn tires of step (1) to the stored data to thereby non-destructively determine the potential wear property of the unworn tires; and,
   5. dividing the tires of step (4) into groups of tires wherein each tire of the same group has similar expected wear properties.

10. The method of claim 9 wherein each tire of a group is provided with indicia which identifies the group in which the tire has been classified.

* * * * *